C. E. JOHNSON.
PISTON AND PISTON RING.
APPLICATION FILED OCT. 11, 1915.
1,240,456.
Patented Sept. 18, 1917.
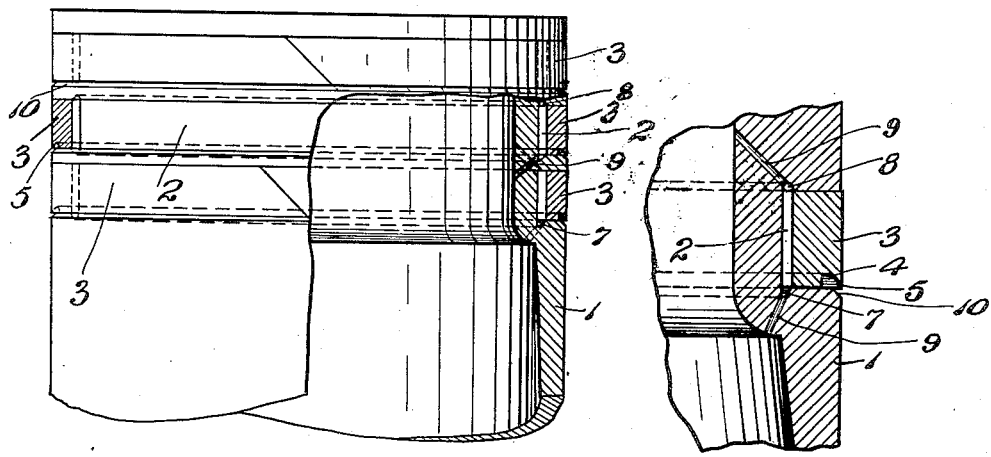
Fig. 1.  Fig. 2.
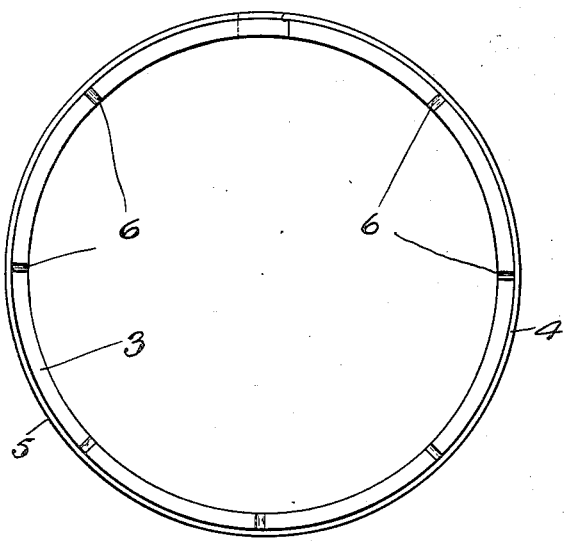
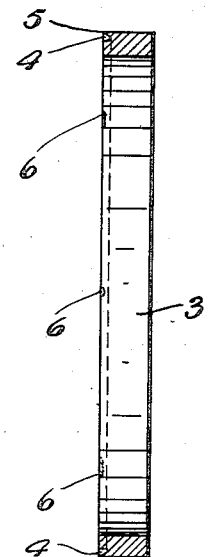
Fig. 3.  Fig. 4.
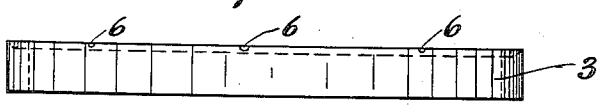
Fig. 5.
Inventor
Charles E. Johnson
By Moulton & Limance
Attorneys.

UNITED STATES PATENT OFFICE.

CHARLES E. JOHNSON, OF MUSKEGON, MICHIGAN.

PISTON AND PISTON-RING.

1,240,456.  Specification of Letters Patent. Patented Sept. 18, 1917.

Application filed October 11, 1915. Serial No. 55,304.

*To all whom it may concern:*

Be it known that I, CHARLES E. JOHNSON, a citizen of the United States of America, residing at Muskegon, in the county of Muskegon and State of Michigan, have invented certain new and useful Improvements in Pistons and Piston-Rings; and I do hereby declare the following to be a full, clear, and exact description of the invention, such as will enable others skilled in the art to which it appertains to make and use the same.

This invention relates to an improved piston and piston ring therefor, the object and purpose of which is to prevent, to as great a degree as possible, the entrance of lubricating oil from the crank case of an internal combustion engine to the combustion chamber between the head of the piston and the head of the cylinder in which the piston moves. My previous application, Serial No. 45,353, filed August 13, 1915, discloses a novel construction of ring which is adapted to remove the excess of oil from the walls of the cylinder by gathering it in a groove cut on the underside of the ring and passing it through radial passages formed in the ring to the bottom of the piston ring groove cut in the piston from which it may be carried from the piston to the interior thereof and back into the crank case, it being understood that the interior of the piston is in communication with the crank case in an internal combustion engine. I find that this ring performs its functions thoroughly so far as removing an excess of oil from the wall of the cylinder but that the passageways through the cylinder walls are not properly constructed and arranged to take care of the excess of oil. My present invention, therefore, has for its object the construction of a piston and the formation of receiving grooves and diagonal passageways therein to readily carry the oil away from the piston ring grooves after it has once been carried therein after collection by the novel piston ring used for that purpose.

For an understanding of the construction in which my invention is embodied, reference may be had to the accompanying drawing, in which;

Figure 1 is a side view, with parts broken away and in section, of the upper part of a piston constructed in accordance with my invention and equipped with piston rings of the type shown in my former application.

Fig. 2 is an enlarged sectional view through a portion of a piston showing one groove and the ring located therein and the passageways for carrying away the excess of oil.

Fig. 3 is an underneath plan view of the piston ring used.

Fig. 4 is a transverse section taken therethrough; and

Fig. 5 is a side elevation of the ring.

Like reference characters refer to like parts throughout the several views of the drawing.

The piston indicated at 1 has a plurality of ring receiving grooves 2 cut therein in the usual manner in which piston rings 3 are located, these rings at their outer edges and on their undersides have a groove 4 cut therein leaving a lip 5 as shown which is formed around the entire circumference of the ring. Radial passages 6 lead from the groove 4 inwardly and as the piston moves downwardly in the cylinder it will be apparent that the lip serves to scrape off the excess of oil which may adhere to the walls of the cylinder in which the piston moves. The oil is carried into the groove 4 and passes through the passageways 6 behind the ring.

At the bottom of the piston ring grooves 2 at the lower and upper corners thereof, recessed grooves 7 and 8 of the formation best shown in Fig. 2 are formed. Oil passing through the passageway 6 collects in these grooves as it is forced back of the ring 3. On the downward stroke of the piston, where before there has been a tendency for the oil to pass between the upper side of the ring 3 and the lower side of the groove 2 in which it is located, it now enters groove 8 and is guided normally through the upwardly and inwardly extending passages 9 to the interior of the piston. On the upward stroke of the piston the oil through gravity and by reason of the movement of the piston goes into the lower groove 7 and is guided through lower downwardly and inwardly extending passages 9 to the interior of the piston, all of the oil in this manner being carried to the interior of the piston and not passing above the ring and into the combustion chamber as it has a tendency to do if proper and sufficient passages like those indicated are provided.

There is also shown at 10 a chamfer at the lower front edge of the ring groove which makes a wider passage for the excess of oil to groove 4 as it is collected by the lip 5, though this feature is not absolutely essential to the working of the ring. Various other minor changes may be resorted to without departing from the invention which is defined in the appended claims.

I claim:—

1. In combination, a piston having a ring receiving groove with upwardly and downwardly inclined passages connecting the upper and lower rear portions of the groove with the interior of the piston, and a ring seated in the groove, said ring on its lower outer portion having a groove cut therein to provide a lip adapted to scrape oil from the inner surface of a cylinder, and with radial passages extending inwardly from said groove, substantially as described.

2. In combination, a piston having a ring receiving groove formed with an upwardly extending recessed groove at its upper inner corner and also having a plurality of upwardly and inwarly extending passages connecting said recessed groove with the interior of the piston, and a ring seated in the groove, said ring on its lower outer portion having a groove cut therein to provide a lip adapted to escape oil from the inner surface of a cylinder, and with radial passages extending inwardly from said groove, substantially as described.

3. A piston having a ring receiving groove, said groove at its inner upper and lower corners being provided with recessed grooves extending from said ring receiving groove, said piston also being formed with upwardly and inwardly extending passages connecting the interior of the piston and the upper recessed groove and downwardly and inwardly extending passages connecting the interior of the piston with the lower recessed groove.

In testimony whereof I affix my signature.

CHARLES E. JOHNSON.